June 12, 1962
B. H. THURMAN
3,038,486
SYSTEM OF PROPORTIONING FLUIDS
Filed Sept. 3, 1957
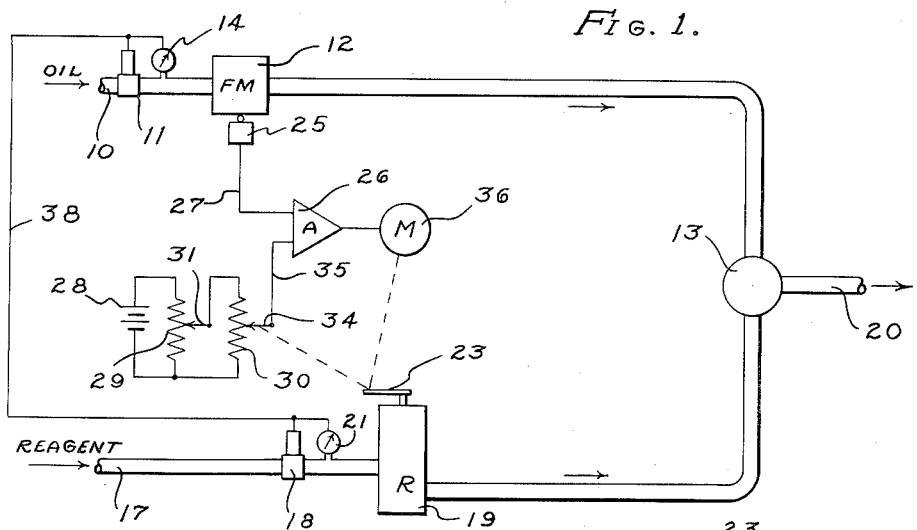
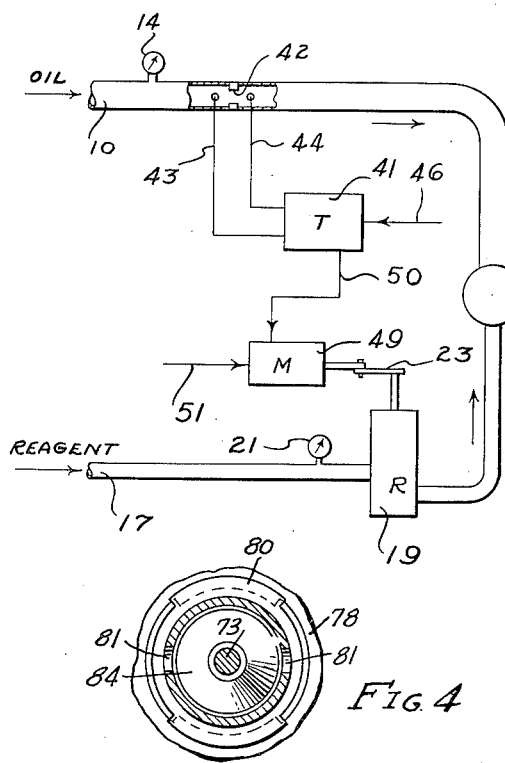
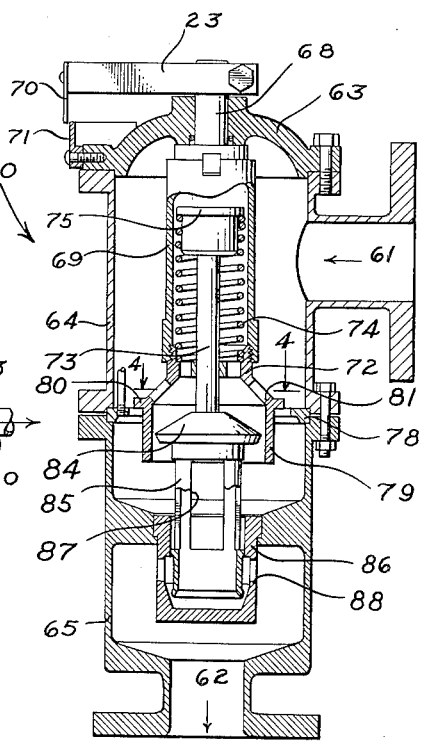
INVENTOR
BENJAMIN H. THURMAN
BY HIS ATTORNEYS
HARRIS, KIECH, FOSTER & HARRIS

United States Patent Office 3,038,486
Patented June 12, 1962

---

3,038,486
SYSTEM OF PROPORTIONING FLUIDS
Benjamin H. Thurman, New York, N.Y., assignor to Benjamin Clayton, doing business as Refining, Unincorporated, a sole proprietorship
Filed Sept. 3, 1957, Ser. No. 681,850
4 Claims. (Cl. 137—99)

This invention relates to proportioning of fluids and, in particular, to a system for maintaining constant the proportions of different fluids that are to be mixed together in a continuous mixing operation.

In many continuous fluid operations, a quantity of one fluid is added at a controlled rate to a stream of a second fluid and it is desired to maintain the ratio of the fluids substantially constant although the rate of flow of one or both may vary continuously. Accordingly, it is an object of the invention to provide a system for mixing two continuously flowing fluids in a predetermined proportion while the rate of flow of the fluids to the system may be varying. Another object of the invention is to provide such a system especially adapted for use where one of the fluids may be used in very small quantities, such as in the order of 0.5%.

It is a further object of the invention to provide a proportioning system which is especially adapted for use in the continuous refining of glyceride oils, wherein a stream of reagent is continuously added to a stream of crude oil, the reagent being from about 0.5% to 15% of the resultant mixture. In such operations, the particular percentage or proportion is determined by analysis of the crude oil prior to the mixing operation and it is desirable to accurately maintain this proportion substantially constant during the treating operation.

It is another object of the invention to provide a proportioning system having a rate of flow regulating unit in one flow line, preferably the minor flow line, and a rate of flow measuring unit in another flow line, preferably the major flow line, in which the output of the rate of flow regulating unit is maintained substantially constant and in which the magnitude of this constant output is changed in response to variations in the output of the flow measuring unit. Another object of the invention is to provide such a system in which the constant output or set point of the rate of flow regulating unit may be changed independently of the output of the flow measuring unit to vary the desired proportion of the two fluids which the system controls.

While the proportioning system of the invention is intended to operate over a varying range of input flow rates in both flow lines, such flow rates may occasionally exceed the operating ranges of the system and, therefore, it is an object of the invention to provide input flow rate or pressure sensing instruments which will produce control and/or alarm signals for preventing operation of the system outside its known limits.

It is a further object of the invention to provide such a proportioning system which may utilize various types of control equipment such as electrical, pneumatic, hydraulic, and the like. Another object of the invention is to provide such a system in which three or more fluids may be mixed while maintaining a predetermined proportion between one of the fluids and each of the other fluids.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 is a schematic diagram of a preferred embodiment of the invention utilizing an electrical control system;
FIG. 2 is a schematic diagram of an alternative embodiment of the invention utilizing a pneumatic control system;
FIG. 3 is a sectional view of a rate of flow regulating valve suitable for use in the invention; and
FIG. 4 is a fragmentary horizontal sectional view taken on the line 4—4 of FIG. 3.

While the proportioning system of the invention is suitable for use in mixing two fluids in any proportions, it is especially adapted for use in mixing a very small quantity of one fluid with a large quantity of another fluid, such proportions being as low as fractions of one percent. FIG. 1 schematically represents a portion of a glyceride oil refining system in which a small quantity of reagent is continuously added to a relatively large stream of crude oil. Crude oil is introduced into the system at pipe 10, flows through a solenoid operated valve 11 and a flow meter 12 to a mixer 13. A pressure gauge 14 is coupled to the crude oil flow line between the valve 11 and the flow meter 12. Reagent is introduced into the system at pipe 17 and flows through a solenoid controlled valve 18 and a rate of flow regulating valve unit 19 to the mixer 13, the two fluids being mixed and leaving the system illustrated herein through a pipe 20. A pressure gauge 21 is connected to the reagent flow line between the solenoid valve 18 and the regulating unit 19.

The rate of flow regulating valve unit 19 is of the automatic, unitary, self-actuated type which provides a substantially constant output rate of flow although its input rate of flow varies over a wide range. The set point or magnitude of this constant output rate of flow may be changed by adjusting the unit, such as by rotating a set point control lever 23. In the proportioning system of the invention, means are provided for varying the set point control lever and, therefore, the output rate of flow in the reagent flow line as a function of the rate of flow in the crude oil flow line so that the proportion of oil and reagent remains constant. A reference signal indicative of the set point of the reagent flow regulator is combined with an oil rate of flow signal to actuate a servo mechanism which mechanically drives the set point control lever 23.

In the embodiment of FIG. 1, the flow meter 12 may be of the rotating type driving an electrical generator 25 producing an electrical signal the magnitude of which is a function of the crude oil rate of flow. The output of the generator 25 is connected as an input to a null amplifier 26 by a circuit 27. The reference signal source may include a battery 28 with a potentiometer 29 connected thereacross and a second potentiometer 30 connected between an arm 31 and one end of the potentiometer 29. The set point control lever 23 is mechanically coupled to an arm 34 of the potentiometer 30, providing position feedback so that the signal appearing at the arm 34 is a function of the set point of the regulating unit 19, the reference signal at the arm 34 being connected as another input to the amplifier 26 by a circuit 35. The output of the amplifier 26, which is a function of the difference between the oil and reference signals, is coupled to a motor 36 and serves to energize the motor to mechanically drive the set point control lever 23.

The amplifier 26 has an output which energizes the motor 36 and drives the control lever 23 to vary the reference signal and bring the input to the amplifier to a null at which time a particular proportion of oil and reagent will be mixed in the system. When the rate of flow of oil changes, the oil signal to the amplifier will change correspondingly and the motor will be energized to actuate the set point lever and the reference potentiometer arm to change the reference signal and again bring the amplifier to the null condition. At the same time the output rate of flow of reagent from the regulating unit will have been changed since the set point lever was moved and the sense and proportions of the various components of the system are selected so that a reduction in oil rate of flow will cause a corresponding reduction in reagent rate of flow to maintain the proportion of oil and reagent the same as it was prior to the change in oil rate of flow. Similarly, an increase in oil rate of flow produces a corresponding increase in reagent rate of flow, maintaining the proportion contant.

When desired, the proportions of reagent to oil may be changed or reset by moving the set point lever 23 independently of the oil rate of flow to provide a new value of reagent output rate of flow from the regulating unit for the same oil rate of flow. This may be accomplished in a number of known ways such as by changing the output of the generator 25 relative to the rate of flow through the flow meter, mechanically rotating the motor 36 relative to the lever 23 or rotating the lever 23 relative to the motor and potentiometer or moving the potentiometer arm relative to the lever by loosening and retightening couplings or utilizing slip clutches, or by inserting variable impedances in one or more of the electrical signal circuits. A preferred and simple form of proportion adjustment is shown in FIG. 1 wherein the potentiometer 29 coupled across the battery 28 serves as a voltage divider providing a control of the magnitude of the reference signal by actuation of the arm 31. For any particular group of components, the position of the arm 31 may be calibrated in terms of proportion or percentage providing a manually actuable control for the output of the system.

In the system described above, D.C. electrical voltages have been used and the signals have constituted magnitude variations of these voltages. However, it is understood that A.C. voltages are equally suitable and variations in frequency or phase as well as magnitude may be utilized to provide signals.

The rate of flow regulating valve unit 19 is an automatic, self-contained unit which provides a substantially constant output rate of flow of fluid over a wide range of input rates of flow. However, such units usually have some limitation on the input range and quite often will not shut off the flow completely. Therefore, means may be provided to actuate a flow control and/or an alarm when the oil or reagent input flow rate is outside the operating range of the components. A preferred form of such equipment is shown in FIG. 1 including the pressure gauges 14, 21 and the solenoid actuated valves 11, 18. Each gauge may be provided with conventional electrical limit contacts so that when the pressure in the respective line is above or below the operating range, a control circuit is closed to energize a suitable alarm such as a bell, a light, or the like, and/or to actuate a flow control device such as the solenoid actuated valves 11, 18 to shut off the entire system. The gauge contacts and solenoids are interconnected via an electrical cable 38. Alternatively, flow control may be achieved by controlling the pumps which produce the flow or by installing by-pass valves around the pumps.

An alternative embodiment of the proportioning system of the invention utilizing a pneumatic control system is shown in FIG. 2, wherein elements identical to those of FIG. 1 are indicated by the same reference numerals. Rate of flow in the oil line 10 is determined by a differential pressure transducer 41 which is connected to both sides of a restriction 42 in the oil line by lines 43, 44, an outside source of air under pressure being supplied to the transducer through a line 46. A pneumatic actuated motor 49 is mechanically connected to the set point lever 23 of the regulating valve unit 19 for controlling the set point of the reagent output rate of flow. The pneumatic motor 49 may be a conventional air cylinder and piston with a control valve providing position feedback as a reference signal, the oil flow signal being connected to the motor from the transducer 41 through a line 50, and a source of air under pressure for providing power to the motor being connected thereto through a line 51. The operation of the system of FIG. 2 will be the same as the operation of the system of FIG. 1. For example, when the rate of flow of oil past the restriction 42 increases, a signal will be produced by the transducer 41 causing the motor 49 to move the set point control lever 23 to increase the output rate of flow of reagent from the regulating unit 19. When the rate of flow of oil past the restriction 42 remains constant, the output rate of flow from the regulating unit 19 will also remain constant although the input rate of flow of reagent in the pipe 17 may be varied, provided, of course, that this variation remains within the operating range of the system.

In the embodiments described above, the flow rate through one line has been maintained in a predetermined proportion to the flow rate in another line. The flow rates in each of several lines can be maintained in predetermined proportions to the flow rate in another or master line by using the same system with separate rate of flow regulating units and power units for each of the several flow rates being controlled with a single rate of flow measuring unit in the master line to provide the flow signal.

A preferred form of rate of flow regulating valve unit is shown in greater detail in FIG. 3. A housing 60 has a fluid inlet 61 and a fluid outlet 62, the housing comprising an upper section 63, a middle section 64, and a lower section 65 bolted together to form a unitary fluid-tight structure. The lever 23 is clamped to a shaft 68 which is rotatably mounted in the upper section 63 with a valve spring cylinder 69 suspended therefrom within the housing. A pointer 70 may be fixed to the lever 23 and a scale 71 mounted on the upper section 63 to give a visual indication of the setting of the unit.

A spring seat 72 is carried at the bottom of the cylinder 69 with a valve 73 slideably disposed therein, a compression spring 74 being positioned between the spring seat 72 and a head 75 of the valve. An orifice plate 78 is clamped between the middle and lower sections of the housing opposite a flared portion 79 of the spring seat 72. A skirt 80 projects outward from the spring seat 72 toward the orifice plate 78. Both the skirt and the orifice plate have irregular outlines, e.g., as illustrated in FIG. 4 so that the cross-sectional area of the space therebetween varies as a function of the angular position of the skirt which is controlled by the lever 23. A plurality of openings 81 are also provided in the spring seat above the skirt.

The valve includes a cap 84 positioned within the flared portion 79 of the spring seat and a cylindrical section 85 below the cap and slideably disposed in a valve seat 86 which is carried in the lower section 65 of the housing. A plurality of openings 87 are provided in the cylindrical section 85 of the valve and a plurality of openings 88 are provided in the valve seat 86.

There are two flow paths for the fluid passing through the valve unit. In one path, fluid enters the fluid inlet 61, passes through the openings 81 into the interior of the spring seat 72, flows downward past the cap 84 of the valve (then through the openings 87 into the interior of the cylindrical section 85 and out the bottom thereof between the valve and valve seat, outward through the openings 88 and out of the fluid outlet 62. In the second path, fluid enters the fluid inlet 61, passes between the skirt 80 and orifice plate 78, and then mixes with the fluid following in the first flow path. The rate of flow of fluid through the valve unit is a function of the vertical position of the valve 73. This vertical position is a function of the downward force exerted on the cap 84 by the fluid flowing into the spring seat and the upward force exerted by the spring 74. The components of the valve unit are so dimensioned that the output rate of flow is substantially constant over a given range of input rates of flow. The magnitude of the output rate of flow is changed by rotating the lever 23 and thereby the spring seat 72 to change the area of the opening between the skirt 80 and orifice plate 78 and thereby change the relative magnitudes of the stream of fluid flowing into the spring seat and the stream bypassing the spring seat.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a system for mixing a first fluid in a first flow line with a second fluid in a second flow line in a predetermined proportion, the combination of: fluid rate of flow measuring means disposed in the first line, said measuring means producing a flow signal as a function of the rate of flow of the first fluid; a rate of flow regulating valve disposed in said second line for maintaining the output flow rate of the second fluid substantially at a preset value, said valve having a first variable orifice with control means externally movable to vary said orifice to establish said preset value and a second variable orifice downstream of said first variable orifice with flow responsive means to automatically vary said second variable orifice to maintain said preset value; feedback means connected to said control means and producing a set signal as a function of the set point of said means, said set signal being indicative of the output flow rate through said flow regulating valve; power means coupled to said control means in driving relationship; and means for coupling said flow signal and said set signal to said power means, the output of said power means being a function of the difference between said signals.

2. In a system for mixing a first fluid in a first flow line with a second fluid in a second flow line in a predetermined proportion, the combination of: fluid rate of flow measuring means disposed in the first line, said measuring means producing a flow signal as a function of the rate of flow of the first fluid; a rate of flow regulating valve disposed in said second line for maintaining the output flow rate of the second fluid substantially at a preset value, said flow regulating means including a first flow path through a first variable orifice and a second variable orifice, and a second parallel flow path through a piston chamber containing a spring-biased piston and said second variable orifice, with the second fluid in said second flow path impinging on said piston in said chamber and working against said spring to position the piston in the chamber and control said second variable orifice; a control member for changing said preset value independently of the regulating action of said regulating means by controlling said first variable orifice bypassing said piston chamber; feedback means connected to said control member and producing a set signal as a function of the set point of said member, said set signal being indicative of the output flow rate through the rate of flow regulating means; power means coupled to said control member in driving relationship; and means for coupling said flow signal and said set signal to said power means, the output of said power means being a function of the difference between said signals.

3. The system defined by claim 1 wherein means are provided for varying the control means to change the proportions of fluid flow in said first and second flow lines to different values.

4. The system defined by claim 1 wherein said flow measuring means and said feedback means provide electrical signals, said power means is an electric motor, and wherein said means coupling said flow signal and said set signal to said power means includes a difference amplifier receiving said signals are inputs and producing an output which is a function of the difference of said signals with said output coupled to said motor in driving relationship for operating the control means to change the set rate of flow of the second fluid as a function of changes in said flow and feed-back signals to maintain the relative flow rates of said fluids constant.

References Cited in the file of this patent

UNITED STATES PATENTS

| | | |
|---|---|---|
| 1,901,032 | Kallam | Mar. 14, 1933 |
| 2,160,582 | Brugma | May 30, 1939 |
| 2,322,374 | Lowe | June 22, 1943 |
| 2,352,584 | Ziebolz et al. | June 27, 1944 |
| 2,420,415 | Bristol | May 13, 1947 |
| 2,646,060 | Ponsar | July 21, 1953 |

UNITED STATES PATENT OFFICE
CERTIFICATE OF CORRECTION

Patent No. 3,038,486            June 12, 1962

Benjamin H. Thurman

It is hereby certified that error appears in the above numbered patent requiring correction and that the said Letters Patent should read as corrected below.

Column 4, line 69, for "valve (then" read -- valve, then --; column 6, line 1, for "valve" read -- means --.

Signed and sealed this 16th day of October 1962.

(SEAL)
Attest:

ERNEST W. SWIDER
Attesting Officer

DAVID L. LADD
Commissioner of Patents